United States Patent [19]

Yeh

[11] Patent Number: 4,522,353
[45] Date of Patent: Jun. 11, 1985

[54] AUTOMATIC CASSETTE EJECTING DEVICE

[76] Inventor: Chun T. Yeh, No. 6, Lane 308 Pao-Shan Rd., Hsinchu City, Taiwan

[21] Appl. No.: 538,795

[22] Filed: Oct. 4, 1983

Related U.S. Application Data

[63] Continuation-in-part of Ser. No. 208,190, Nov. 19, 1980, Pat. No. 4,380,322.

[51] Int. Cl.$^3$ .......................... G03B 1/04; G11B 15/32
[52] U.S. Cl. ..................................... 242/198; 360/93; 474/106
[58] Field of Search ..................... 242/186, 188–190, 242/192, 197, 198, 201; 360/93, 96.1, 96.5, 96.6; 474/75, 101, 106, 107, 109

[56] References Cited

U.S. PATENT DOCUMENTS

| | | | |
|---|---|---|---|
| 3,863,267 | 1/1975 | Fujinaka | 360/93 |
| 3,902,681 | 9/1975 | Boehme | 242/198 |
| 3,974,982 | 8/1976 | Stone | 242/192 |
| 3,988,779 | 10/1976 | Leis et al. | 360/96 |
| 4,259,701 | 3/1981 | Pera | 360/96.5 |

FOREIGN PATENT DOCUMENTS 1044822  11/1953  France .................................. 242/201

OTHER PUBLICATIONS

IBM Technical Disclosure Bulletin, vol. 15, No. 1, Jun. 1972, "Floating Belt Tension Adjustor", F. Gratkowski, p. 193.

Primary Examiner—Leonard D. Christian
Attorney, Agent, or Firm—Lackenbach, Siegel, Marzullo, Presta & Aronson

[57] ABSTRACT

An automatic tape ejecting device for a tape rewinding apparatus responsive to an increase of the tension difference between the tight side strand and the slack side strand of the transmission belt which drives the pulley to perform the tape rewinding. The change of tension difference is sensed by at least one small pulley which is arranged in the running path of the transmission belt to increase the tension thereof. The motor is driven in such direction that the tight side strand will be tightened while the slack side strand will slip in the small pulley upon the winding spindle being precluded from rotation, consequently, the increased tension on the tight side strand will initiate the cassette compartment lid ejection action and turn off the switch.

3 Claims, 3 Drawing Figures

AUTOMATIC CASSETTE EJECTING DEVICE

CROSS-REFERENCE TO RELATED APPLICATION

This application is a continuation-in-part of U.S. patent application, Ser. No. 208,190, filed Nov. 19, 1980, now U.S. Pat. No. 4,380,322 granted on Apr. 19, 1983.

BACKGROUND OF THE INVENTION

The present invention relates to an improved rewinding apparatus for cassettes such as video cassettes, and more specifically concerns a mechanically device which can automatically eject the cassette.

In order to make the magnetic head durable, a conventional video cassette recorder does not employ the built-in rewinding apparatus to rewind the tape. Instead, an independent rewinding apparatus is usually used to perform such function. When the independent rewinding apparatus is at work, the user must watch and in particular wait until the completion of the rewinding, and then eject the cassette manually. To avoid the inconvenience of such apparatus, some automatic ejecting type rewinding apparatuses have appeared in the market, one of which as referred above, generally comprises a built-in tape end detecting solenoid actuated by the electric signal which starts the cassette ejection action; and an electronic control circuit for automatically cutting off the power supply.

SUMMARY OF THE INVENTION

It is a primary object of the present invention to provide a video cassette rewinding apparatus with improved precision in operation.

It is another object of the present invention to provide a video cassette rewinding apparatus with simplified structure which lends itself to the benefit of economical manufacture.

The nature of the present invention may be stated in general terms as including a frame, a cassette compartment lid having an end pivoted at the frame, and a winding spindle driven by a transmission belt, the apparatus comprising a catch member disposed at said cassette compartment lid for fastening and holding said cassette compartment lid in a closed position; a controlling member pivoted at the frame for controlling the release of the catch member, including a free end; a tension sensing member which abuts against both the tight side strand and the slack side strand of the transmission belt, so that when the tension of the belt is increased, the tension sensing member is moved to actuate the catch member in response to an increase of tension difference between the tight side strand and the slack side strand when the spindle is precluded from rotating while the transmission belt is urged to move by a motor.

The tension sensing member comprises an actuating member pivotally mounted on the frame, and a pulley provided with spaced flanges is rotatably mounted on the actuating member, the tight side strand and the slack side strand of the transmission belt is so retained and separated by the flanges of the pulley that the tension of the transmission belt is increased thereby when the spindle is precluded from rotating while the transmission belt is urged to move by a motor, the tension difference between the tight side strand and the slack side strand will be increased so that the pulley is significantly biassed to actuate the catch member.

Alternatively, the tension sensing member comprises an actuating member pivotally mounted on the frame and a pair of pulleys rotatably mounted on the actuating member, the pair of pulleys are positioned transversely to the running of the transmission belt and respectively tensioned and being driven by the tight side strand and the slack side strand of the transmission belt, whereby when the spindle is precluded from rotating while the transmission belt is urged to move by a motor, the difference of tension between the tight side strand and the slack side strand will be manifested so that the pulleys are significantly biased to actuate the catch member.

The above and still further objects, features, and advantages of the present invention will become more aparent as the description proceeds.

DETAILED DESCRIPTION OF THE PREFERRED EMBODIMENTS

Figure 1:
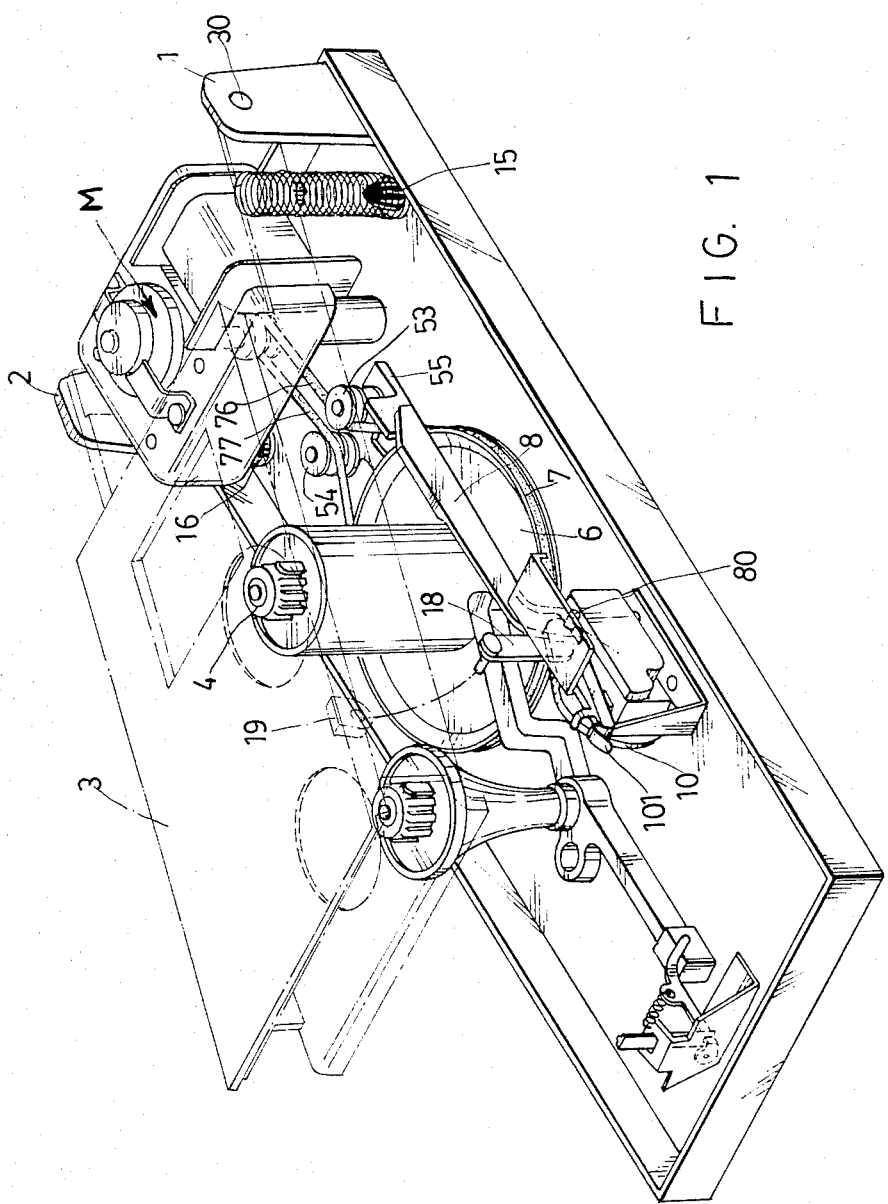
FIG. 1 is a schematic view of an embodiment of a video cassette rewinding apparatus made according to the present invention.

Referring now to FIG. 1, there is shown a tape rewinding apparatus embodying the invention. A pair of brackets 1 and 2 mounted on the frame are space parallel to each other. A cassette compartment lid 3 has a groove (not shown in the drawings) for holding the cassette, and it is pivoted at the brackets 1 and 2 by pins 30 (only one shown). At the underside of the lid 3 there is provided a connecting element 18. The connecting element 18 has an end pinned on a small bracket 19 (shown in phantom in FIG. 1) provided on the lower surface of the lid 3. The other lower end of the connecting element 18 is pivoted to a crank arm 10 by a pin 80, and the pin 80 protrudes through the crank arm 10 so as to be capable of being retained under a straight arm 8. Thus, the protruding portion of pivot pin 80 serves as a laterally extending portion or conventional latch means or a catch like means or member which suitably holds and/or fastens the cassette compartment lid 3 in a closed position when the lid 3 is retained under a straight arm 8. The lid 3 is raised by the resilience of springs 15, 16 through crank arm 10 to buffer the ejection action. A winding spindle 4 is driven by transmission belt 7 through a pulley 6 which is provided at the bottom of the winding spindle 4. The straight arm 8 has an end adjacent to the crank arm 10 (as shown in phantom), and as a consequence thereof the tension difference of the type side strand 76 and the slack side strand 77, the straight arm 8 is pushed outwardly thereof by the small pulley 53 and results in disengaging the catch means or end protrusion of pin 18 from under the straight arm 8.

Above the pulley 6, the straight arm 8 is situated in such manner that it can be moved outwardly, which with one end adjacent to the crank arm 10.

In the embodiment shown in FIG. 1, a tongue member 55 is pivoted to the winding spindle 4 under the pulley 6 with one end thereof. There are a pair of small pulleys 53, 54 mounted on the free end of the tongue member 55 and driven by the tight side strand 76 and the slack side strand 77 of the transmission belt 7 in the condition that the motor M and shaft thereof which is shown in phantom (which elements are accommodated within the overall housing between brackets 1 and 2) are driven counterclockwise.

As soon as the tape runs to the end, the winding spindle 4 is precluded from rotating, at this moment, the ongoing motion of a motor will cause the slip of the slack side strand 77 of belt 7 on the small pulley 54, and, at the same moment, the tight side 76 is further tightened, consequently, the tension difference originally existing between the tight side strand 76 and the slack side strand 77 is abruptly increased. The tightening of the tight side strand 76 entails a straightening tendency of the same, therefore, the tight side strand 76 will impel the small pulley 53 toward the straight arm 8 and push the latter to move a distance sufficient to disengage the catch means or member from fastening and holding the lid in a closed position, thus actuating the compartment lid 3 to raise and break the circuit established in the apparatus. note that the tongue-like member positioned above the crank arm 10 is a microswitch 101 which can be switched "on" by the lid 3 when the lid 3 is lowered to a closed position and in contact with the microswitch 101. When the lid 3 is raised, the microswitch 101 is switched "off", thus breaking the electrical circuit. Such arrangement is known in the art and forms no part of the present invention.

Figure 2:
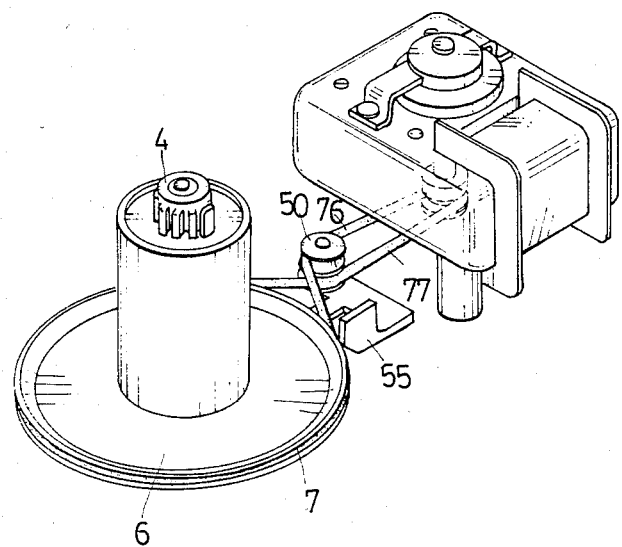
FIG. 2 is a partial schematic view showing another embodiment of the video cassette rewinding apparatus made according to the present invention.

Another embodiment of this invention is shown in FIG. 2.

In order to achieve the tension sensing function by means of one small pulley 50, the tight side strand 76 and the slack side strand 77 of the transmission belt 7 are crossed with respect each other so as to retain and increase the tension thereof by the small pulley 50. The motor applied in this embodiment is driven counterclockwise, so that the tight side strand 76 normally biases the small pulley 50 toward the straight arm (not shown) of the tight side strand. As soon as the tape runs to the end, the slack side strand 77 will slip in the small pulley 50 while the tight side strand 76 will be tightened and straightened, thus pushing the tongue member 55 to initiate the ejection of the cassette compartment lid.

Figure 3:
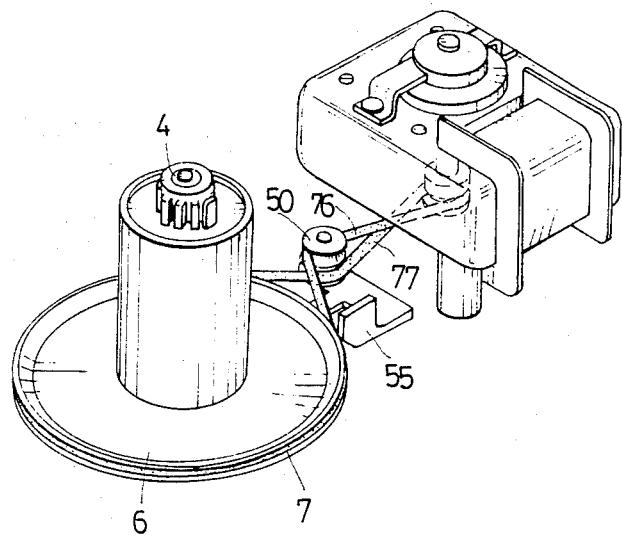
FIG. 3 is a partial schematic view showing a further embodiment of the video cassette rewinding apparatus made according to the present invention.

A further embodiment is shown in FIG. 3, in order to avoid the adjustment of the driving direction of the motor, the transmission belt 7 can be crossed again between the motor and the small pulley 50, and the same function can be performed by such arrangement.

While the invention has been described in connection with what is presently considered to be most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

I claim:

1. An improved tape rewinding apparatus for a video cassette including a frame and a motor mounted therein, a cassette compartment lid having an end pivoted to said frame, and a winding spindle driven by a transmission belt, the apparatus comprising:

catch means disposed at said cassette compartment lid for fastening and holding said cassette compartment lid in a closed position; and a tension sensing member abutting against said transmission belt on both a tight side strand and a slack side strand of said transmission belt in such a direction that with increasing belt tension, said tension sensing member is moved to actuate said catch means in response to an increase in the tension difference between said tight side strand and said slack side strand of said transmission belt when the winding spindle is precluded from rotating while the transmission belt is urged to move by said motor.

2. An improved tape rewinding apparatus for a video cassette as claimed in claim 1, wherein said tension sensing member includes an actuating member pivotally mounted on said frame, and a pulley provided with spaced flanges is rotatably mounted on said actuating member, said tight side strand and said slack side strand of said transmission belt is retained and separated by the flanges of said pulley to increase the tension thereof, and the transmission belt is driven in such a direction that the tight side strand thereof will tighten and straighten to actuate said catch means when the spindle is precluded from rotating while the transmission belt is urged to move by said motor.

3. An improved tape rewinding apparatus for a video cassette as claimed in claim 1, wherein said tension sensing member includes an actuating member pivotally mounted on said frame and a pair of pulleys rotatably mounted on said actuating member, said pair of pulleys are aligned transversely to the running of said transmission belt and respectively driven by the tight side strand and the slack side strand of said transmission belt to increase the tension thereof, and the transmission belt is driven in such a direction that the tight side strand thereof will tighten and straighten to actuate said catch means when the spindle is precluded from rotating while the transmission belt is urged to move by said motor.

* * * * *